United States Patent

Oya et al.

[11] Patent Number: 6,153,308
[45] Date of Patent: Nov. 28, 2000

[54] MULTILAYERED BIAXIALLY-ORIENTED STYRENE BASED RESIN SHEET AND METHOD FOR PRODUCTION THEREOF

[75] Inventors: Satoshi Oya, Ichihara; Hidetsugu Sawada, Chiba; Akio Toyoda, Ichihara; Kosuke Arai; Nobuyuki Konishi, both of Chiba; Koji Adachi, Ichihara, all of Japan

[73] Assignee: Dainippon Ink and Chemicals, Inc., Tokyo, Japan

[21] Appl. No.: 09/251,405

[22] Filed: Feb. 17, 1999

[30] Foreign Application Priority Data

Feb. 19, 1998 [JP] Japan .................. 10-037193

[51] Int. Cl.[7] ............................................ B32B 27/08
[52] U.S. Cl. .................. 428/515; 428/910; 428/213
[58] Field of Search ............... 428/DIG. 910, 428/515, 212, 213, 35.1, 35.2, 521, 525; 156/244.11

[56] References Cited

U.S. PATENT DOCUMENTS

| | | | |
|---|---|---|---|
| 3,791,916 | 2/1974 | Eastes | 428/523 |
| 4,011,357 | 3/1977 | Haase | 428/215 |
| 5,162,137 | 11/1992 | Placek | 427/299 |
| 5,474,855 | 12/1995 | Antheunisse | 428/515 |

FOREIGN PATENT DOCUMENTS

| | | | |
|---|---|---|---|
| 0 780 214 | 6/1997 | European Pat. Off. | |
| 2-239933 | 9/1990 | Japan . | |
| 07156342 | 6/1995 | Japan | B32B 27/30 |
| 97/12758 | 4/1997 | WIPO . | |
| 97/36798 | 10/1997 | WIPO . | |

*Primary Examiner*—Paul Thibodeau
*Assistant Examiner*—Monique R. Jackson
*Attorney, Agent, or Firm*—Armstrong, Westerman, Hattori, McLeland & Naughton

[57] ABSTRACT

A multilayered biaxially-oriented styrene based resin sheet comprises; a styrene based resin layer (A) as at least two outer layers formed by the polymerization of methacrylic acid in a weight proportion of 1–3.5% and styrene, and a styrene based resin layer (B) formed from polystyrene which is sandwiched between the outer layers and for which the loss tangent (tan $\delta$) maximum peak value temperature for dynamic viscoelasticity measurement is 6.5–25° C. lower than that for the resin of the resin layer (A). The sheet has excellent properties of transparency and external appearance, can be reused by recovering and moreover does not suffer from raindrop occurrence by secondary forming.

4 Claims, No Drawings

MULTILAYERED BIAXIALLY-ORIENTED STYRENE BASED RESIN SHEET AND METHOD FOR PRODUCTION THEREOF

BACKGROUND OF THE INVENTION

1. Field of the Invention

The present invention relates to a biaxially-oriented styrene based resin sheet, and in particular to a multilayered biaxially-oriented styrene based resin sheet which can be formed under a wide range of heat conditions and which enables improvements in deep drawability and form reproducibility by secondary forming and the suppression of raindrop formation without losing the excellent transparency and durability properties of an OPS sheet.

2. Description of the Related Art

Biaxially-oriented polystyrene sheets (hereafter referred to as OPS sheets) are widely used in packaging containers for light weight foods and in the packaging of other products as they display excellent properties of environmental hygiene, nerve, transparency, mold reproducibility and recoverability. Common secondary forming method of the sheets includes the so-called contact heating pressure forming method wherein the sheet and a hot plate are convection heated and the softened sheet is then pushed into a mold cavity by pressure from the hot plate and shaped. In this method, by sandwiching the sheet between an external frame and the hot plate with excess load, orientation shrinkage is prevented, and because a large pressure is applied, this molding method is ideal for the forming of biaxially-oriented sheets which possess orientation. However, there were several problems with this secondary forming method including difficulty in controlling of the hot plate temperature during the early stages of secondary forming or upon alteration in the forming conditions, a worsening in the form reproducibility when the hot plate is at lower temperatures, and furthermore the occurrence of a spotted pattern known as raindrops in sections where the hot plate temperature was too high.

In order to overcome the problems described above, Japanese Patent Application, First Publication No. Hei-2-239933 discloses a technique to prevent the occurrence of raindrops associated with fluctuations in the hot plate temperature by secondary forming, by using a copolymer of styrene and methacrylic acid as the resin for the outer layer and polystyrene as the inner layer to provide a biaxially-oriented sheet with a wider forming temperature range.

However, although the biaxially-oriented sheet of Japanese Patent Application, First Publication No. Hei-2-239933 certainly increases the temperature at which raindrops occur by secondary forming and widens the forming temperature range, because the proportion of methacrylic acid in the resin of the outer layer is high, the difference in the fluidity of the resin of the outer layer and that of the inner layer is large, and stripe and wave patterns develop on the surface of the sheet, leading to a whitening and a large drop in the transparency and external appearance of the sheet. Particularly in large production devices with large dischargable volumes there is a tendency for the shearing stress value in the layer combining section to increase giving a marked deterioration in external appearance. Furthermore, because there is no compatibility between the resin of the outer layer and the resin of the inner layer, recovering scraps of the sheet during sheet production or during removal following sheet molding, recovering waste portions of its molding products, and then reusing the scraps in biaxially-oriented sheets also leads to whitening.

Furthermore, for biaxially-oriented sheets of the same layered construction described above, a technique for improving the fluidity and compatibility of the resins of the inner and outer layers by lowering the proportion of methacrylic acid incorporated in the outer layer is disclosed in Japanese Patent Application, First Publication No. Hei-7-156342, which proposes a biaxially-oriented sheet comprising an outer layer of a copolymer of styrene and methacrylic acid in which the weight proportion of methacrylic acid is in the range from 1 to 4%, and an inner layer of polystyrene, but although the external appearance of this sheet is good due to the good compatibility of the inner and outer layers, there is a narrowing of the forming temperature range, and the occurrence of raindrops by secondary forming becomes problematic.

SUMMARY OF THE INVENTION

It, is an object of the present invention to provide a multilayered biaxially-oriented styrene based resin sheet which has excellent properties of transparency and external appearance, can be reused by recovering and moreover does not suffer from raindrop occurrence by secondary forming, and a method for the production thereof.

Based on intense research aimed at solving the above problems, the inventors of the present invention identified that by using a styrene based, i.e., styrene-containing resin layer (A) on at least the two outer layers formed by the polymerization in a specific ratio of an aromatic vinyl compound and an ethylene based, i.e., ethylene-containing unsaturated carboxylic acid, and moreover using a specific styrene based resin for the inner layer, the transparency and external appearance of the sheet were retained at good levels, the forming temperature range was widened and the occurrence of raindrop formation by secondary forming was prevented, and that moreover scraps or waste portions of sheet forming products could be recovered and reused.

The present invention then, relates to a multilayered biaxially-oriented styrene based resin sheet characterized by comprising; a styrene based resin layer (A) on at least two outer layers formed by the polymerization of an aromatic vinyl compound and an ethylene based unsaturated carboxylic acid as the essential monomers where the weight proportion of the ethylene based unsaturated carboxylic acid is in the range from 1 to 3.5%, and a styrene based resin layer (B) which is sandwiched between the outer layers and which is formed from a styrene based resin for which the loss tangent (tan δ) maximum peak value temperature for dynamic viscoelasticity measurement is from 6.5 to 25° C. lower than that for the resin of the resin layer (A), and a production method for a multilayered biaxially-oriented styrene based resin sheet wherein a styrene based resin (a) formed by the polymerization of an aromatic vinyl compound and an ethylene based unsaturated carboxylic acid as the essential monomers where the weight proportion of the ethylene based unsaturated carboxylic acid is in the range from 1 to 3.5%, and a styrene based resin (b) for which the loss tangent (tan δ) maximum peak value temperature for dynamic viscoelasticity measurement is from 6.5 to 25° C. lower than that for the resin (a) are (process 1) melted and mixed separately,
(process 2) combined together in a resin combination section and coextruded through a die so that the resin (a) forms an outer layer, and
(process 3) then biaxially stretched.

The present invention is able to provide a multilayered biaxially-oriented styrene based resin sheet which has excellent properties of transparency and external appearance, can be reused by recovering and moreover does not suffer from raindrop occurrence by secondary forming, and a method for the production thereof.

DETAILED DESCRIPTION OF THE PREFERRED EMBODIMENTS

A sheet of the present invention incorporates at least three layers with two outer layers (A) made of a specific styrene based resin and an inner layer (B) made of another styrene based resin.

The styrene based resin outer layers (A) of a sheet of the present invention are composed of a styrene based resin (a) formed by the polymerization of an aromatic vinyl compound and an ethylene based unsaturated carboxylic acid as the essential monomers where the weight proportion of the ethylene based unsaturated carboxylic acid is in the range from 1 to 3.5%.

Examples of suitable ethylene based unsaturated carboxylic acids for generating the styrene based resin (a) include acrylic acid, methacrylic acid, maleic anhydride and itaconic acid, and suitable aromatic vinyl compounds include vinyl monomers which incorporate an aromatic ring such as styrene and α-methylstyrene. Furthermore, (meta) acrylicalkylesters such as methyl(meta)acrylate or stearyl (meta)acrylate can also be used in conjunction with the monomers detailed above. Of the above compounds, styrene-methacrylic acid copolymers formed using methacrylic acid as the ethylene based unsaturated carboxylic acid and styrene as the aromatic vinyl compound are preferable, particularly in terms of the heat resistance and oil proof properties thereof.

As described above, in producing the styrene based resin (a), from 1 to 3.5% by weight of an ethylene based unsaturated carboxylic acid is incorporated into the monomer ingredients. At weight proportions of the ethylene based unsaturated carboxylic acid less than 1% the forming temperature range narrows, and the polymer displays insufficient heat resistance to suppress the occurrence of raindrops, whereas at weight proportions above 3.5% the difference in fluidity and compatibility from the resin (b) described below increases, the external appearance and the transparency of the sheet deteriorates, and scraps or waste portions of sheet which arise during molding can no longer be reused. That is, at weight proportions of the ethylene based unsaturated carboxylic acid within the from 1 to 3.5% range, the difference in refractive index of the styrene based resin (a) of the outer layer and the styrene based resin (b) of the inner layer is very small, and even sheets obtained from reused material display excellent transparency and are free from any whitening or opaqueness.

To achieve a good balance of the above properties, usage of the ethylene based unsaturated carboxylic acid in weight proportions within the range from 2 to 3.5% of the monomer ingredients is even more preferable.

Furthermore, although there are not particular restrictions on the weight average molecular weight of the styrene (a), values within the range from 20 to 30×10$^4$ are preferable in terms of sheet transparency and mold reproducibility and in terms of widening the forming temperature range and suppressing the occurrence of raindrops.

In order to further improve the raindrop prevention effect, the methanol soluble component of the styrene based resin layer (A) formed from the styrene based resin (a) should preferably be not more than 1.5% by weight. Although there are not particular restrictions on the constituents of the methanol soluble component, examples include styrene monomer, and other low molecular weight volatile components such as mineral oil and styrene oligomer which are typically added as fluidity modifiers. Methanol soluble components of not more than 1% by weight are even more desirable as they enable an even greater raindrop prevention effect.

The styrene based resin layer (B) of a sheet of the present invention is composed of a styrene based resin (b) for which the loss tangent (tan δ) maximum peak value temperature for dynamic viscoelasticity measurement is from 6.5 to 25° C. lower than that for the resin (a).

The loss tangent (tan δ) maximum peak value temperature for dynamic viscoelasticity measurement refers to the loss tangent (tan δ) maximum peak value temperature as measured by the testing method relating to the temperature dependency of dynamic viscoelasticity (JIS-K-7198, method A). By using a resin for which this maximum peak value temperature is from 6.5 to 25° C. lower than that for the resin (a), the transparency and external appearance of the sheet are retained at good levels, and the forming temperature range can also be widened.

Specific examples of the styrene based resin (b) include polystyrene, styrene-butadiene-styrene block, rubber containing polystyrene, resins of styrene based ionomers, copolymers of aromatic vinyl compounds and ethylene based unsaturated carboxylic acids, or alternatively mixtures thereof, but of these, polystyrene is preferable as the maximum peak value temperature described above is low, and moreover sheets produced using polystyrene have good transparency and mold reproducibility.

Furthermore, in order to ensure that the heat resistance temperature of the forming products is not less than the 92° C. required to allow heating of foodstuffs within the container, styrene base resins (b) for which the Vicat softening temperature is not less than 95° C. are preferable. Moreover in the present invention, OPS or scraps of the biaxially-oriented sheet of the present invention or waste portions of sheet which arise during sheet forming can also be mixed in as part of the styrene based resin (b).

Although there are not particular restrictions on the weight average molecular weight of the styrene (b), values within the range from 20 to 40×10$^4$ are preferable in terms of reducing the loss tangent (tan δ) maximum peak value temperature for dynamic viscoelasticity measurement, while maintaining the strength of the forming products.

There are not particular restrictions on the methods for reducing the maximum peak value temperature for the styrene based resin (b), and suitable methods include fluidity adjustment by typical modifiers such as mineral oil or low molecular weight styrene, molecular weight adjustment during the production phase of the styrene based resin (b), and adjustment by using blends of resins of different fluidity grades.

With the present invention, adjustment by the addition of mineral oil is particularly effective, and by adjusting the molecular weight to fall within the aforementioned range and also adding mineral oil, the maximum peak value temperature is reduced and the strength of the forming products is retained at a good level.

Furthermore, in order to ensure a good sheet surface condition, it is preferable that the difference in the MI values of the styrene based resin (a) and the styrene based resin (b) should be not more than a two-fold difference.

A multilayered biaxially-oriented styrene based resin sheet of the present invention has a construction wherein a styrene based resin layer (A) comprising the styrene based resin (a) is provided on the two outer layers, and a styrene based resin layer (B) comprising the styrene based resin (b) is sandwiched between the two outer layers.

A three layered construction wherein the styrene based resin layer (A) is layered on the two outer surfaces of the styrene based resin layer (B), that is an (A) layer/(B) layer/(A) layer type configuration is suitable, but of course other constructions such as an (A) layer/(B) layer/(A) layer/(B) layer/(A) layer type five layer configuration, or an (A) layer/(B) layer/(A) layer/(B) layer/(A) layer/(B) layer/(A) layer type seven layer configuration are also possible.

Moreover, there are not particular restrictions on the method of production, provided the layers have been biaxially stretched as a whole, and for example the styrene based resin layer (A) can be bonded with an adhesive to both surfaces of the styrene based resin layer (B), but molten coextrusion methods are preferable.

Specifically, the preferred method of production of the present invention is a method wherein a styrene based resin (a) formed by the polymerization of an aromatic vinyl compound and an ethylene based unsaturated carboxylic acid as the essential monomers where the weight proportion of the ethylene based unsaturated carboxylic acid is in the range from 1 to 3.5%, and a styrene based resin (b) for which the loss tangent (tan δ) maximum peak value temperature for dynamic viscoelasticity measurement is from 6.5 to 25° C. lower than that for the resin (a) are (process 1) melted and mixed separately, (process 2) combined together in a resin combination section and coextruded through a die so that the resin (a) forms an outer layer, and (process 3) then biaxially stretched.

In order to prevent the occurrence of distortions in the product following secondary forming, it is preferable that the thicknesses of the two outer layers (A) are approximately equal. Furthermore, the thickness of one layer of the outer styrene based resin layer (A) should preferably be between 0.5 and 7% of the entire thickness of the sheet, so as to achieve a wide forming temperature range, with values between 0.5 and 2.3% being particularly desirable in terms of achieving a good external appearance of deep drawn portions by secondary forming. Moreover, in order to ensure better form reproducibility the combined thickness of the two outer layers (A) should preferably be between 1~14%, with values between 1 and 4.6% being particularly desirable. In those constructions comprising three or more layers of layer (A), the combined thickness of all the (A) layers should preferably be not more than 70% of the entire thickness of the sheet.

Although there are not particular restrictions on the extrusion conditions employed in the molten coextrusion of processes 1 and 2, typically the resins are melted and mixed at polystyrene sheet conditions of from 220 to 280° C. and then coextruded through a multi-manifold die, or alternatively following melting and mixing the styrene based resin (a) and the styrene based resin (b) are bonded together inside a feed block which acts as a resin combination device, and then extruded in molten form through a T die and layered. In these cases, sheet production should preferably be conducted with the shear rates inside the feed block and die within the range from 1 to 1,000 $sec^{-1}$, and the resin viscosity maintained within the range from 100 to 2,000 Pa.S by adjusting conditions such as the temperature.

Furthermore, in terms of achieving a good level of smoothness of the surface of the produced sheet, it is preferable that the shearing stress of the styrene resin (a) which becomes the outer layer inside the feed block or multi-manifold die during process 2 is less than 15,000 Pa. Moreover, in order to ensure stability in production, values less than 12,000 Pa are even more desirable.

The sheet produced by molten extrusion is then biaxially stretched in process 3 to achieve a prescribed thickness. Depending on necessity, the resin extruded from the die can be affixed to a casting roll to generate a uniform thickness and then the temperature adjusted prior to biaxial stretching. Suitable devices for supplying the resin to the casting roll in a stable manner include touch roll, air knife, and in the case of thin sheets electrostatic pinning methods.

The distance between lips in the die should preferably be in the range from 0.2 to 3.0 mm, with values in the range from 0.2 to 2.0 mm being particularly desirable in terms of ease of sheet formation.

There are not particular restrictions on the method used for the biaxial stretching, although methods in which simultaneous biaxial stretching or simultaneous biaxial stretching of the unstretched sheet extruded from the die is conducted using a tenter and differences in roll velocity are preferable.

The stretch magnification ratio will vary depending on the purpose of the sheet, although normally surface stretch magnification ratios of between 3 and 15 fold are preferable, with values between 4 and 10 fold being even more desirable. In the case of consecutive stretching, the stretch magnification ratio in the flow direction is typically between 1.2 and 5 fold with values between 1.5 and 4 fold being preferable, and the stretch magnification ratio in the cross direction typically between 1.2 and 5 fold with values between 1.5 and 3 fold being preferable.

In the case of simultaneous biaxial stretching, the stretch magnification ratio in each direction is between 1.5 and 5 fold with values between 2 and 4 fold being preferable.

Although there are not particular restrictions on the temperature conditions during simultaneous or simultaneous biaxial stretching, conducting the stretching so that the orientation release stress measured in accordance with ASTM D-1504 is within the range from 1.5 to 13 $Kgf/cm^2$ is preferable as it can prevent breaking during stretching, and improves the secondary forming properties of the sheet.

Furthermore, values of the orientation relaxation force between 3–10 are even more desirable as the sheet obtained therefrom has very good foldability and excellent mold reproducibility.

With the multilayered biaxially-oriented styrene based resin sheet of the present invention, additives such as slipping agents, antistatic agents, mold release agents, antifogging agents, coloring agents and antibacterial agents commonly used in OPS sheets can be incorporated into the styrene based resin layer (B) or the styrene based resin layer (A), or alternatively coated on to the surface of the sheet, provided so doing does not lower the effectiveness of the present invention. Of these, the use of slipping agents and antifogging agents are desirable, as they help maintain the surface condition of the sheet, and improve the effects of the present invention. Specific slipping agents include silica, PS cross-linked beads and high impact polystyrene, and specific antifogging agents include fatty acid glycerate esters, fatty acid sorbitanate esters and sucrose fatty acid esters. Moreover, the sheet surface can be printed on to improve the look or functionality of the sheet, and resin films with barrier properties, antibacterial properties or heat sealing properties can also be laminated on to the sheet surface.

Pressure thermoforming of biaxially-oriented sheets of the present invention under the same conditions as for currently available biaxially-oriented polystyrene sheets using molds of prescribed shapes enables containers and lids of desired shapes to be produced readily and simply. Moreover, molding is also possible using vacuum pressure forming or vacuum forming methods.

EXAMPLES

The present invention is explained in detail below with reference to the working examples. However, the present invention is not limited to these examples, nor is there any intention to limit the scope of the invention.

Evaluations of the various properties were conducted using the following methods.

[Loss tangent (tan δ) maximum peak value temperature]

Measured in accordance with method A, JIS-K-7198

[Vicat softening temperature]

Measured in accordance with JIS K7206

[Shearing stress]

The shearing stress just before the resin combination section was determined by conducting a flow characteristic test of the target resin using method JIS K7199 and then examining the relationship between the true shearing stress on the wall surface and the shear velocity. The shear velocity refers to the shear velocity (γw) at the point just before the resin mixing section inside the feed block, and is determined by the following formula:

$$\gamma w = 6Q/(WH^2) \quad (1)$$

γw: shear velocity ($s^{-1}$), Q: volumetric flow rate ($m^3/s$), W: long side of the channel at the point just before resin combination (m), H: short side of the channel at the point just before resin combination (m).

[Condition of the sheet surface]

The surface condition of the sheets obtained from the working examples and the comparative examples were compared by examining for the presence of stripe or wave patterns resulting from differences in the fluidity of the resin on the two surfaces.

Evaluation criterion of surface condition:

O; smooth surface with no stripe or wave patterns

X; presence of stripe or wave patterns

[Recoverability]

Sheets obtained from the working examples and the comparative examples were molded into lunch box lids, and then each was crushed, dry blended with polystyrene (Mw= 265,000) at 20% and 50% levels, and then stretched using a biaxial stretching device under the same stretch magnification ratio, orientation release stress, and temperature conditions as working example 1 to produce a sheet of thickness 0.21 mm. The haze value for the sheet was then measured using method JIS K7105 to determine the reusability.

Evaluation criterion:

O; from 0 to 2% Δ; from 2 to less than 5% X; 5% or greater

[Transparency]

The haze value was measured in accordance with JIS K7105.

Evaluation criterion: O; from 0 to 2% Δ; from 2 to less than 5% X; 5% or greater

[Tensile strength]

Measured in accordance with JIS K7127

Evaluation criterion: O; 50 MPa or greater X; less than 50 MPa

[Heat resistance]

Defined as the minimum temperature within the range from 30 to 100° C. whereby placement of the sheet in an oven heated to the specified temperature for a period of 5 minutes produces a 2% shrinkage in the sheet (2% shrinkage temperature). The shrinkage ratio is defined as the length of shrinkage during heat treatment divided by the original length of the sheet, and then displayed as a percentage (%).

Evaluation criterion: O; 94° C. or greater Δ; from 90 to less than 94° C. X; less than 90° C.

[Secondary mold reproducibility]

Molding was conducted using the molding apparatus and mold described below, and the forming products then evaluated in terms of form reproducibility, the occurrence of raindrops and the occurrence of whitening.

Molding apparatus: Contact heating pressure forming apparatus (made by Kansai Jidoo Molding Corporation)

Hot plate temperature: from 120 to 150° C.

Heating period: 2.0 seconds

Forming pressure: 3 kg/cm$^2$

Mold cavity 1: Length×width×depth=180×125×20 mm

Mold cavity 2: Length×width×depth=73×63×30 mm

Lower limit molding temperature: The minimum temperature that yields a form reproducibility ratio of 80% or greater.

Whitening occurrence temperature: The maximum temperature above the lower limit molding temperature at which whitening occurs.

Upper limit molding temperature: The temperature at which raindrop occurrence begins.

Forming temperature range: The range between the lower limit molding temperature and the upper limit molding temperature (or the whitening occurrence temperature in the cases where whitening occurs.)

The span of the forming temperature range was used as the evaluation criterion:

O; 8° C. or greater Δ; from less than 8 to 6.5° C. X; from less than 6.5 to 4° C. XX; less than 4° C.

The resins used are shown in Table 1.

TABLE 1

| Resin No. | Copolymer styrene-methacrylic acid | | | PS | | |
|---|---|---|---|---|---|---|
| | A | B | C | D | E | F |
| Weight average molecular weight (×10$^4$) | 29 | 24 | 22 | 35 | 25 | 30 |
| Amount of methacrylic acid incorporated (wt %) | 3.5 | 2.5 | 10 | — | — | — |
| Methanol soluble component (%) | 1.1 | 0.8 | 0.8 | 2.8 | 1.2 | 2.0 |
| MI (g/min) | 1.7 | 2.9 | 1.5 | 1.8 | 2.5 | 1.2 |
| Loss tangent (tan δ) (° C.) | 125 | 122 | 138 | 112 | 116 | 114 |
| Vicat softening temperature (° C.) | 111 | 109 | 120 | 96 | 103 | 100 |
| Amount of mineral oil incorporated (%) | 0 | 0 | 0 | 2 | 0 | 1 |

Working Example 1

Using a coextrusion apparatus with a 30 mm diameter for the styrene-methacrylic acid based resin of the outer layer, the composition of which is shown in Table 2, and a 65 mm diameter for the polystyrene resin, the resins were melted at 240° C. and following passage through a 2 type 3 layer partitioning device with a vane opening of 20% for the outer layer, were extruded through a T die to produce a layered sheet of thickness 1.0 mm Next, using a biaxial stretching device, a cut sheet of length 10 cm and width 10 cm was stretched 2.2 fold both longitudinally and transversely at 120° C. to give a sheet of thickness 0.21 mm.

The calculated value for the shearing stress of the outer layer at the point of resin combination, the surface condition of the sheet, the recoverability, transparency, tensile strength, heat resistance and mold reproducibility of each sheet was then evaluated. The results are shown in Table 2. Each sheet showed excellent results in each test.

Working Example 2

Using a coextrusion apparatus with a 30 mm diameter for the styrene-methacrylic acid based resin of the outer layer, the composition of which is shown in Table 2, and a 65 mm diameter for the polystyrene resin, the temperature for the outer layer resin was set to 270° C. and the temperature for the central layer resin set to 240° C., and following passage through a 2 type 3 layer partitioning device with a vane opening of 8% for the outer layer, the molten resins were extruded through a T die to produce a layered sheet of thickness 1.0 mm.

Next, using a biaxial stretching device, a cut sheet of length 10 cm and width 10 cm was stretched 2.6 fold both longitudinally and transversely at 122° C. to give a sheet of thickness 0.15 mm.

The calculated value for the shearing stress of the outer layer at the point of resin combination, the surface condition of the sheet, the recoverability, transparency, tensile strength, heat resistance and mold reproducibility of each sheet was then evaluated. The results are shown in Table 2.

Working Example 3

Using a coextrusion apparatus with a 30 mm diameter for the styrene-methacrylic acid based resin of the outer layer, the composition of which is shown in Table 2, and a 65 mm diameter for the polystyrene resin, the temperature for the outer layer resin was set to 230° C. and the temperature for the central layer resin set to 240° C., and following passage through a 2 type 3 layer partitioning device with a vane opening of 30% for the outer layer, the molten resins were extruded through a T die to produce a layered sheet of thickness 1.0 mm.

Next, using a biaxial stretching device, a cut sheet of length 10 cm and width 10 cm was stretched 1.8 fold both longitudinally and transversely at 118° C. to give a sheet of thickness 0.30 mm.

The calculated value for the shearing stress of the outer layer at the point of resin combination, the surface condition of the sheet, the recoverability, transparency, tensile strength, heat resistance and mold reproducibility of each sheet was then evaluated. The results are shown in Table 2.

Working Example 4

Using a coextrusion apparatus with a 30 mm diameter for the styrene-methacrylic acid based resin of the outer layer, the composition of which is shown in Table 2, and a 65 mm diameter for the polystyrene resin, the temperature for the outer layer resin was set to 240° C. and the temperature for the central layer resin set to 240° C., and following passage through a 2 type 3 layer partitioning device with a vane opening of 20% for the outer layer, the molten resins were extruded through a T die to produce a layered sheet of thickness 1.0 mm.

Next, using a biaxial stretching device, a cut sheet of length 10 cm and width 10 cm was stretched 2.2 fold both longitudinally and transversely at 118° C. to give a sheet of thickness 0.21 mm.

The calculated value for the shearing stress of the outer layer at the point of resin combination, the surface condition of the sheet, the recoverability, transparency, tensile strength, heat resistance and mold reproducibility of each sheet was then evaluated. The results are shown in Table 2.

Comparative Example 1

A 1.0 mm single layer sheet was produced by using material E in both 65 mm and 30 mm extruders using a resin temperature of 230° C. and a vane opening of 6%. The sheet was then biaxially stretched and evaluated in the same manner as working example 1. The results are shown in Table 3. The sheet displayed poor secondary mold reproducibility.

Comparative Example 2

Using material E for the outer layer and material D for the central layer, a sheet was extruded, stretched and evaluated in the same manner as working example 1. The results are shown in Table 3. The molding temperature region was approximately the same as that for a single layer sheet, and no widening of the forming temperature range was observed. Furthermore, the heat resistance temperature was low, making usage of the sheet problematic in the widely available food packaging containers which allow the foodstuff therein to be heated in the container. Moreover, the sheet displayed poor secondary mold reproducibility.

Comparative Example 3

Using material C for the outer layer and material D for the central layer, a sheet was extruded, stretched and evaluated in the same manner as working example 1. The results are shown in Table 3. The external appearance and transparency of the sheet were poor, and recoverability was also problematic.

Comparative Example 4

Using material C for the outer layer and material D for the central layer, a sheet was extruded, stretched and evaluated in the same manner as working example 1. The results are shown in Table 3. The external appearance and transparency of the sheet were poor, and because the outer layer was very thick the temperature at which whitening occurred was low and the secondary mold reproducibility was poor.

Comparative Example 5

Using material B for the outer layer and material E for the central layer, a sheet was extruded, stretched and evaluated in the same manner as working example 1. The results are shown in Table 3. The sheet displayed poor secondary mold reproducibility.

TABLE 2

| Working example | 1 | 2 | 3 | 4 |
|---|---|---|---|---|
| Outer layer material | A | B | A | B |
| Central layer material | D | D | E | F |
| Ratio of thicknesses of layers | 3/94/3 | 7/86/7 | 1/98/1 | 2/96/2 |
| Loss tangent temperature difference ° C. (layer A – layer B) | 13 | 11 | 8.6 | 8 |
| Shearing stress of the outer layer at the resin combination section (Pa) | 7,700 | 13,000 | 4,000 | 12,000 |
| Condition of sheet surface | ◯ | ◯ | ◯ | ◯ |
| Recoverability | ◯ | ◯ | ◯ | ◯ |
| Transparency | ◯ | ◯ | ◯ | ◯ |
| Tensile strength | ◯ | ◯ | ◯ | ◯ |

TABLE 2-continued

| Working example | 1 | 2 | 3 | 4 |
|---|---|---|---|---|
| Heat resistance temperature | ○ | ○ | ○ | ○ |
| Secondary mold reproducibility | ○ | ○ | ○ | ○ |

TABLE 3

| Comparative example | 1 | 2 | 3 | 4 | 5 |
|---|---|---|---|---|---|
| Outer layer raw material | E | E | C | C | B |
| Central layer raw material | E | D | D | D | E |
| Ratio of thicknesses of layers | 3/94/3 | 3/94/3 | 3/94/3 | 15/70/15 | 2/96/2 |
| Loss tangent temperature difference ° C. (layer A – layer B) | 0 | 4.4 | 26 | 26 | 5.6 |
| Shearing stress of the outer layer at the resin combination section (Pa) | 20,600 | 6,300 | 7,100 | 14,000 | 4,800 |
| Condition of sheet surface | Δ | ○ | X | X | ○ |
| Recoverability | ○ | ○ | X | X | ○ |
| Transparency | ○ | ○ | X | X | ○ |
| Tensile strength | ○ | ○ | ○ | ○ | ○ |
| Heat resistance temperature | ○ | X | ○ | ○ | ○ |
| Secondary mold reproducibility | XX | X | ○ | X | X |

What is claimed is:

1. A multilayered biaxially-oriented styrene-containing resin sheet comprising: a styrene-containing resin layer (A) as at least two outer layers formed by the polymerization of an aromatic vinyl compound and an ethylene-containing unsaturated carboxylic acid as the essential monomers where the weight proportion of said ethylene-containing unsaturated carboxylic acid is in the range of from 1 to 3.5% and a styrene-containing resin layer (B) which is sandwiched between said outer layers and which is formed from a styrene-containing resin for which the loss tangent (tan δ) maximum peak value temperature for dynamic viscoelasticity measurement is from 6.5 to 25° C. lower than that for the resin of said resin layer (A).

2. A sheet according to claim 1, wherein the thickness of each said styrene-containing resin layers (A) comprising said outer layers is between 0.5 and 7% of the total thickness of said sheet.

3. A sheet according to claim 1, wherein said styrene-containing resin layer (B) incorporates a mineral oil.

4. A sheet according to claim 1, wherein said styrene-containing resin layer (A) has a methanol soluble component of 1.5% or less than 1.5% by weight.

* * * * *